United States Patent [19]
Mendola

[11] Patent Number: 4,968,128
[45] Date of Patent: Nov. 6, 1990

[54] EYEGLASS FRAME ORNAMENTATION

[76] Inventor: Donald Mendola, 1221 Magie Ave., Union, N.J. 07083

[21] Appl. No.: 293,195

[22] Filed: Jan. 23, 1989

[51] Int. Cl.⁵ ............................................. G02C 11/02
[52] U.S. Cl. ........................................ 351/52; 351/51
[58] Field of Search .................... 351/51, 52, 157, 158

[56] References Cited
U.S. PATENT DOCUMENTS
2,778,136  1/1957  Belgard .................. 351/51

Primary Examiner—Paul M. Dzierzynski
Attorney, Agent, or Firm—Louis S. Gillow

[57] ABSTRACT

An improvement in the ornamentation of eyeglass frames which includes attachments for the removal placement and locking of conventional ornaments such as ear rings, pins, medals, charms, etc. Also disclosed are removable attachments to hold ornaments therein, which attachments can be affixed to eyeglass frames. Also disclosed are ornaments which are part of the attachments which can be affixed to eyeglass frames. All the attachments are provided with locking means to removably secure the ornaments to the eyeglass frames.

5 Claims, 4 Drawing Sheets

EYEGLASS FRAME ORNAMENTATION

BACKGROUND OF THE INVENTION

This invention relates to replaceable ornamentation of eyeglass frames.

The use of ornaments to enhance the beauty and value of eyeglass frames has long been recognized. Ornaments of vaious types have previously been adhered to or imbedded in the eyeglass frames. An object of this invention is to provide an eyeglass frame for removably attaching ornaments to the frame. It is a further object of this invention to provide removable ornaments and attachment means for removably locking ornaments to eyeglass frames. It is another object of this invention to provide removable attachement clasps so that wearers can attach their own ornaments; such as ear rings, pins, medals, charms, etc.; to eyeglass frames.

SUMMARY OF THE INVENTION

Eyeglass frames typically comprise a front, lens supporting bridge fitting over the wearer's nose. The bridge is fastened with a pair of side temples, which are each connnected at one end by a small hinge to the opposite ends, respectively, of the bridge. The other end of the temple is removably placed over the wearer's ears so as to secure the eyeglass frame for the wearer. The improvement of this invention is to provide attachments within the eyeglass frame for removably affixing ornaments thereto. Other attachment means are provided to be removably affixed to the eyeglass frame and for attaching ornaments thereto. Ornaments of conventional design, such as ear rings, pins, medals, charms, etc., cann be affixed to the disclosed attachement eans of this invention. This invention further discloses ornaments have attachment means includes for affixing to eyeglass frames, either to the side temples and/or the bridge.

This invention will be apparent to one skilled in the art by reference to the following description

DETAILED DESCRIPTION OF THE INVENTION

Figure 1:
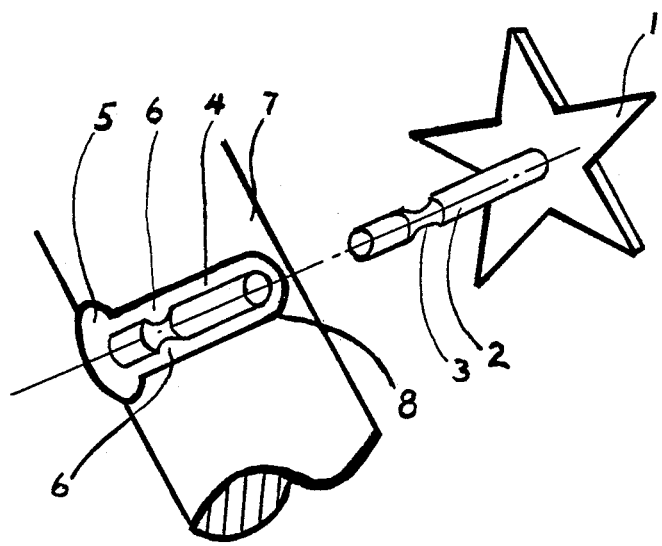
FIG. 1 is a perspective, partially sectional view of a preferred embodiment of the present invention.
Figure 2:
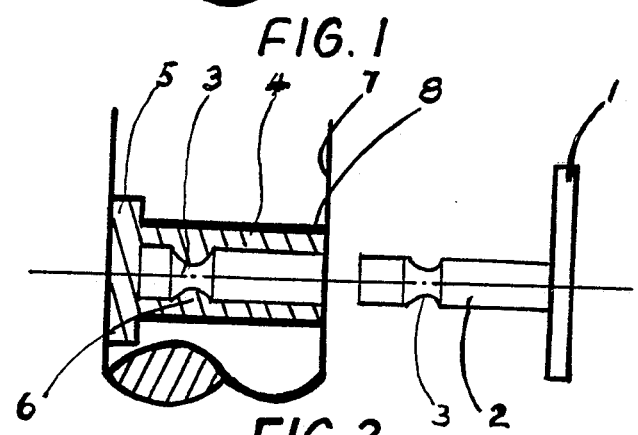
FIG. 2 is partial sectional view of the invention of FIG. 1 with the eyeglass frame and the ornament separated.
Figure 3:
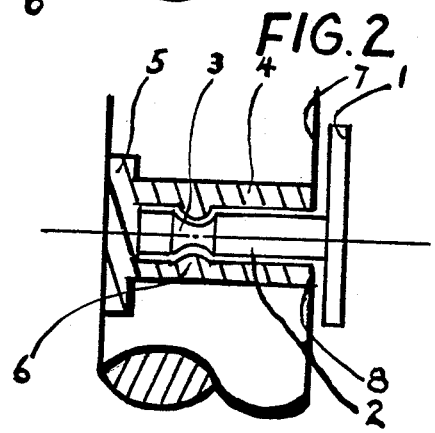
FIG. 3 is a partial sectional view of the invention of FIG. 1 with the eyeglass frame and the ornament in secure engagement.

Referring now to FIGS. 1, 2 and 3 showing the improved eyeglass frame ornamentation of the present invention, the ornament 1 is attached at its inner surface to the end of a cylindrical post 2 which has an annular groove 3 disposed about the middle of the post 2. The post 2 is removably insertable within sleeve 4 which has a closed end 5 at the inner surface adjacent the face of the wearer of the eyeglass temple 7 The sleeve has an annular ring 6 disposed about its middle for mating engagement with the annular groove 3 when the post 2 of the ornament 1 is removably inserted within the sleeve 4. The eyeglass temple has a socket 8 near the hinge connection of the eyeglass temple 7 with the axis of the socket 8 normal to the outside face of the eyeglass temple The sleeve 4 is bushed within the socket 8 of the eyeglass temple 7 so as to provide an in insertion passageway for the removable placement of the post 2 of the ornament 1 therein, whereupon the annular groove 3 and the annular ring 6 mate in locking engagement to secure the ornament 1 to the eyeglass temple 7. The sleeve 4 and the post 2 are made of resilient materials, as in conventional pierced ear rings, annular groove 3 and the annular ring 6 can be released by finger pressure in removal of the post 2 from inside the sleeve 4. It is a feature of this invention that the ornament 1 can also be attached to the eyeglass bridge, or any part of the eyeglass frame.

Figure 4:
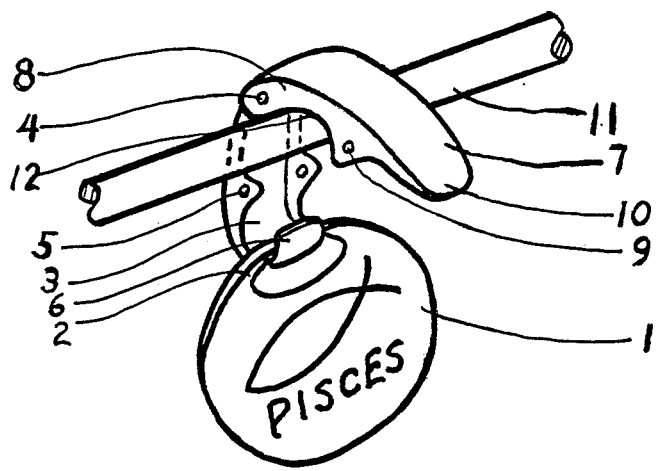
FIG. 4 is a perspective, partially sectional view of another embodiment of the present invention.
Figure 5:
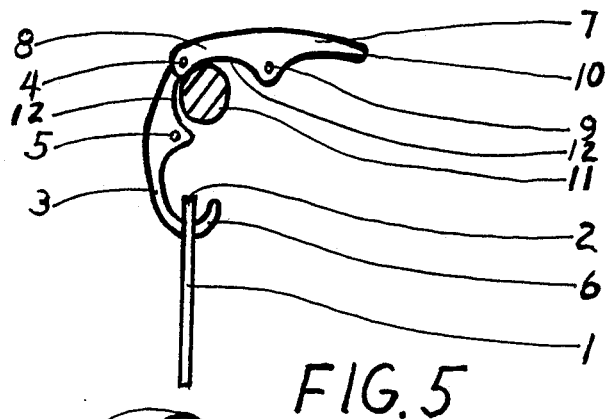
FIG. 5 is a partial sectional view of the invention of FIG. 4 with the attachment clasp in the opened position.
Figure 6:
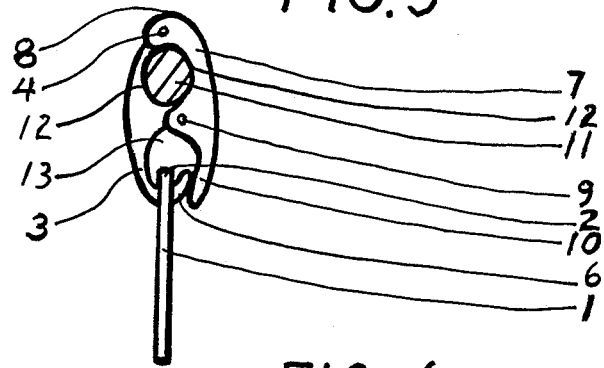
FIG. 6 is a partial sectional view of the invention of FIG. 4 with the attachment clasp in the locked position.

Referring now to FIGS. 4, 5 and 6 showing another embodiment disclosing a clasp attachment for an ornament 1 having an ornament rod 2 on its outer periphery as for charms and medal ornaments. The clasp has a rigid, strap-like clamp 3 terminating into a short, u-shaped holder 6 at its lower end for placement of the rod 2 of the ornament 1 thereon. The upper end of the clamp 3 has a hinge 4 which is connected to and cooperates with a rigid strap-like cover 7 which forms at its upper end , in conjunction with the clamp 3, a first loop 12 encircling the width of the eyeglass temple 11 when the clamp 3 and the cover 7 are brought together in locking engagement. The clamp 3 and the cover 7 together form a second loop 13 which encircles the holder 6 when the clamp 3 and the cover 7 are brought together in locking engagement. The clamp 3 and the cover 7 are locked when they are brought together by mating engagement of a snap perforation 5 in the middle of the clamp 3 which locks with a snap projection 9 in the middle of the cover 7 when the clamp 3 and the cover 7 are brought together over the ornament rod 2 which has been removably placed onto the holder 6.

Figure 7:
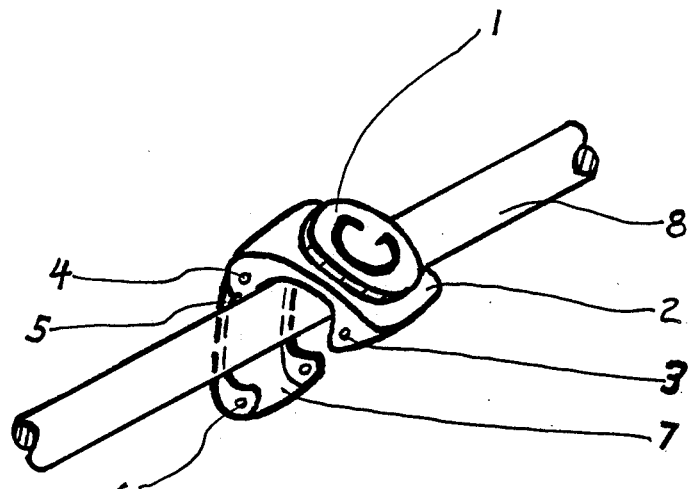
FIG. 7 is a pespective, partially sectional view of a further embodiment of the present invention.
Figure 8:
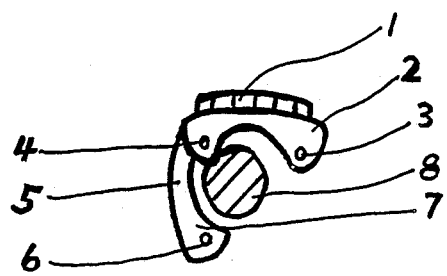
FIG. 8 is a partial sectional view of the invention of FIG. 7 with the attachment clasp in the opened position.
Figure 9:
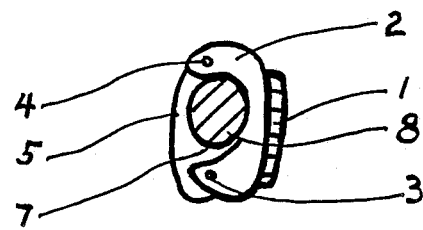
FIG. 9 is a partial sectional view of the invention of FIG. 7 with the attachment clasp in the closed position.

Referring now to FIGS. 7, 8 and 9 showing a further embodiment of the invention disclosing an ornament 1 attached to the outer surface of a rigid, strap-shaped cover 2 which is connected by a hinge 4 at its up per end to the upper end of a rigid strap-shaped clamp 5. The cover 2 and the clamp 5 form a clasp 7 which is in the form of an open loop which can be closed to encircle the width of an eyeglass temple 8. The clasp can be locked when closed together by the mating engagement of a snap perforation 6 at the lower end of the clamp 5 with a snap perforation 3 at the lower end of the cover 2 so as to secure the clasp 7 with the rod 2 of the ornament 1 therein.

Figure 10:
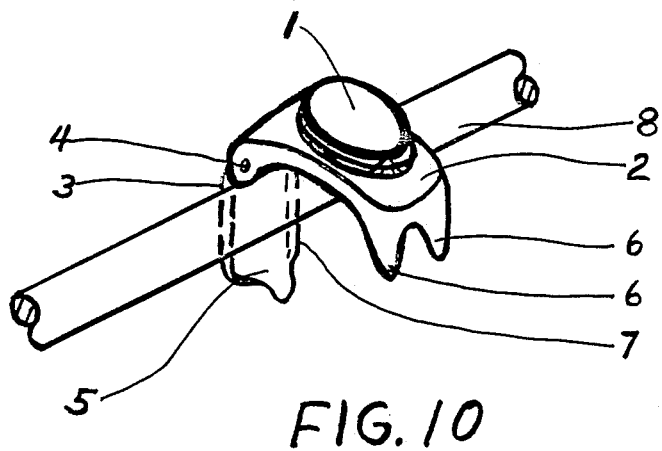
FIG. 10 is a perspective, partially sectional view of an additional embodiment of the present invention.
Figure 11:
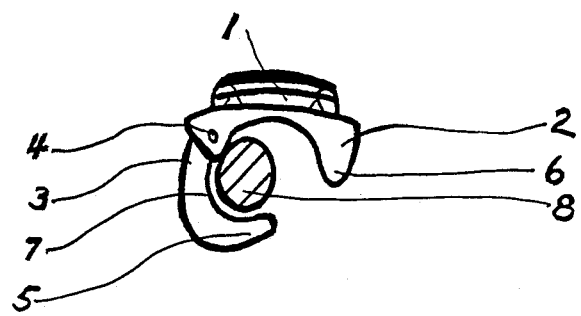
FIG. 11 is a partial sectional view of the invention of FIG. 10 with the attachment clasp in the opened position.
Figure 12:
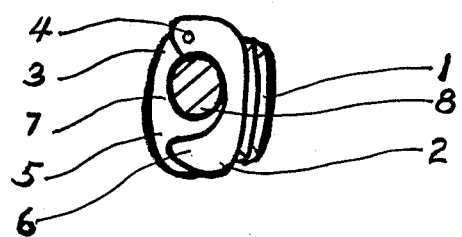
FIG. 12 is a partial sectional view of the invention of FIG. 10 with the clasp in the closed postion.

Referring now to FIGS. 10, 11 and 12 showing an additional embodiment of the invention disclosing an ornament 1 attached to the outer surface of a rigid, strap-shaped cover 2 which is connected by a hinge 4 at its upper end to the upper end of a rigid, strap-shaped clamp 5. The cover 2 and the clamp 5 form a clasp 7 which is in the form of an open loop which can be closed to encircle the width of an eyeglass temple 8. The clasp can be locked when closed together by the meshing engagement of of a strip 5 at the end of the clamp 3 which engages and meshes with one or more strips 6 at the lower end of the cover 2 when the clamp 3 and the cover 2 are brought together encirclircling the width of the eyeglass temple 8.

Having described this invention in detail and by reference to the drawings, it will be apparent that no modifications are possible without departing from the spirit and cope of this invention defined by the following claims.

What I claim is:

1. An eyeglass frame comprising:
   a front, lens supporting bridge;
   a pair of temples, each hingedly connected at one end to opposite ends, respectively of said bridge;
   a clasp having a rigid, strap-like clamp terminating into a short, u-shaped holder at its lower end and a hinge at its upper end; said clamp being hingedly connected to and cooperating in locking engagement with a rigid, strap-like cover which forms at its upper end a first loop with said clamp, which first loop encircles the width of one of said temples; said cover forms at its lower end a second loop with said clamp, which second loop covers the u-shaped holder of said clamp;
   an ornament having a rod on its outer periphery, said rod being held within said u-shaped holder when said rod is removably placed on said holder; and
   locking means for securing the cover over the clamp when the rod of said ornament is removably placed on said holder.

2. An eyeglass frame according to claim 1 wherein the locking means comprise a snap perforation on the clamp in mating engagement with a snap projection on the cover to removably lock said clasp when the clamp and the cover are removably brought together so as to secure said ornament within said clasp.

3. An eyeglass frame comprising:
   a front, lens supporting bridge;
   a pair of temples, each hingedly connected at one end to opposite ends, respectively of said bridge;
   a clasp having a rigid, strap-like clamp conected at its upper end with a rigid strap-like cover at its upper end; which clamp and cover form a loop encircling the width of one of said temples when the lower ends of the cover and the clamp are brought together in locking engagement;
   an ornament attached to the outer surface of said cover so that it is displayed outwardly when the clamp and the cover are brought together in locking engagement; and locking means for securing the cover to the clamp when they are brought together encircling the width of said temple.

4. An eyeglass frame according to claim 3 the locking means comprise a hinge connection between the clamp and the cover at their upper ends; a snap perforation on the clamp in mating engagement with a snap perforation on the cover to removably lock the cover and the clamp together when they are brought together encircling the width of said temple.

5. An eyeglass frame according to claim 3 wherein the locking means comprise a strip at the lower end of the clamp which meshes with one or more strips at the lower end of the cover when the clamp and the cover are brought together encircling the width of said temple.

* * * * *